United States Patent [19]
Blunt et al.

[11] 3,922,257
[45] Nov. 25, 1975

[54] PREPARATION OF FIBROUS COPOLYMERS OF PROPYLENE AND ETHYLENE

[75] Inventors: Harry W. Blunt, Hockessin; Benjamin C. Repka, Newark, both of Del.

[73] Assignee: Hercules Incorporated, Wilmington, Del.

[22] Filed: Oct. 12, 1973

[21] Appl. No.: 406,133

Related U.S. Application Data

[63] Continuation-in-part of Ser. No. 184,188, Sept. 27, 1971, abandoned.

[52] U.S. Cl. ............................................. 260/88.2
[51] Int. Cl.$^2$.... D01F 6/30; C08F 2/06; C08F 4/16; C08F 10/06
[58] Field of Search ................................. 260/88.2

[56] References Cited
FOREIGN PATENTS OR APPLICATIONS
6,915,908   4/1970   Netherlands 1,142,253   2/1969   United Kingdom

OTHER PUBLICATIONS

Holdsworth and Keller, Polymer Letters, 1967, 5, 605–612.

Holdsworth and Keller, J. Polymer Science, 1968, 6, 707–712.

*Primary Examiner*—Joseph L. Schofer
*Assistant Examiner*—A. L. Clingman
*Attorney, Agent, or Firm*—Hazel L. Deming

[57] ABSTRACT

Nascent fibers of crystalline copolymers of propylene containing from 1.5 to 6.8 weight % of ethylene and having an intrinsic viscosity greater than 2.0 are produced by polymerizing a monomer mixture of propylene and up to about 10 molar % ethylene in an aliphatic hydrocarbon diluent in the presence of a catalytic amount of $TiCl_3$ and a dialkylaluminum halide activator.

3 Claims, No Drawings

PREPARATION OF FIBROUS COPOLYMERS OF PROPYLENE AND ETHYLENE

This application is a continuation-in-part of application Ser. No. 184,188, filed Sept. 27, 1971 and now abandoned.

The present invention relates to a process for the production of nascent fibers of crystalline copolymers of propylene and ethylene.

It is known that fibrils, i.e., microfibers of polyethylene and/or polypropylene can be produced by homopolymerizing ethylene or propylene in a suitable reaction medium in the presence of a heterogeneous Ziegler-type catalyst. It is also known that fibers having a gross morphology and size similar to natural cellulosic papermaking fibers can be produced by homopolymerizing an olefin in a suitable reaction medium in the presence of a Ziegler-type catalyst under conditions of high shear stress. While it has been suggested that fibrous copolymers of propylene and ethylene can probably be produced in this same manner, there is no direct teaching that nascent fibers of crystalline copolymers will form, and if they do, that they will be of a useful fibrillar structure and in a practical amount.

Now, in accordance with this invention it has been found that high yields of fibrous copolymers can be produced by polymerizing a mixture of propylene containing up to about 10 molar % ethylene in an aliphatic or alicyclic hydrocarbon as diluent using a catalytic amount of $TiCl_3$ and a dialkylaluminum halide activator. That fibrous copolymers are produced in this manner is indeed surprising since propylene cannot be homopolymerized in aliphatic or alicyclic hydrocarbon diluents with $TiCl_3$ and a dialkylaluminum halide activator to give fibrous polypropylene.

Accordingly, the present invention relates to a process for producing nascent fibers of substantially crystalline copolymers of propylene and ethylene, said copolymers containing 1.5 to 6.8 weight % of ethylene and having an intrinsic viscosity greater than 2.0, which process consists essentially of the steps of introducing a catalytic amount of $TiCl_3$ into a reaction medium consisting essentially of an aliphatic or alicyclic hydrocarbon diluent, a dialkylaluminum halide activator, and a monomer mixture of propylene and up to about 10 molar % of ethylene, agitating the reaction medium under polymerization conditions, preferably at a temperature ranging from about 40° to about 70°C., until fibers of said copolymer are produced and then recovering the fibrous product from the reaction medium at a temperature of 70°C. or below, said catalytic amount of $TiCl_3$ ranging from about 1 to about 20 millimoles per liter of diluent and the molar ratio of activator to $TiCl_3$ ranging from 1:1 to 10:1.

The amount of ethylene necessary for the random copolymerization of propylene and ethylene to give useful fibers, i.e., fibers having an average diameter of about 3 to 12 mils and an average length of about 125 to 250 mils will vary depending upon such factors as the particular catalyst, catalyst concentration, diluent and polymerization conditions. Theoretically, on the basis of 100% conversion of ethylene to copolymer, 2.2 molar % of ethylene is required to give a copolymer containing 1.5 weight % of ethylene. In practice, the amount of ethylene will usually range from about 3 to about 10 molar % and preferably from about 5 to about 10 molar % of the monomer mixture. Although insoluble fibrous polymers are formed at above 10 molar %, the amount of soluble polymer increases as the amount of ethylene increases so that there is an upper practical limit dictated by the economics of the system. At about 3 molar % of ethylene and below the degree of polymerization becomes an important factor. In the practice of the invention it has been found that intrinsic viscosities greater than 2.0 are desirable and dictate a practical lower limit since the yield of insolubles decreases at low intrinsic viscosities. Preferably at least 60% of the fibrous product will comprise useful fibers, i.e., fibers within the above specified ranges of diameter and length.

As stated above, the process of the invention is carried out in an aliphatic or alicyclic hydrocarbon diluent. Preferably the diluent is a saturated hydrocarbon containing from six to 12 carbon atoms. Particularly preferred diluents include hexane, n-heptane, octane, nonane, decane, undecane, dodecane, cyclohexane, decahydronaphthalene and mixtures of any of the above.

Certain catalysts and activators have been found to be useful in producing fibrous copolymers. In the practice of the present invention it has been found advantageous to use $TiCl_3$ as the catalyst and a dialkylaluminum halide as activator. Preferably the alkyl group of the activator contains two to four carbon atoms and the halide is chloride. The amount of catalyst used will vary from about 1 to about 20 millimoles and preferably will range from about 5 to about 10 millimoles per liter of diluent and the ratio of activator to catalyst (i.e., Al:Ti) will preferably range from 1:1 to 10:1 and usually from 2:1 to 4:1.

The copolymerization is carried out under conditions of agitation to insure adequate contact of the monomers and catalyst components. High shear stress, however, is not necessary to achieve the advantages of the invention. The temperature of the polymerization will usually be kept below about 70°C. to prevent fusion of the fibers. The temperature, however, can range as low as about 40°C. The optimum temperature will depend on the particular diluent and usually will range from about 40° to about 65°C.

The invention is further illustrated by the following examples.

EXAMPLES 1 TO 3

In these examples a series of propylene-ethylene copolymerizations were conducted in a stirred reaction vessel containing 2 liters of diluent, the diluent having been sparged with nitrogen and then dried by treatment with silica gel. The vessel was evacuated and then filled to atmospheric pressure with propylene, following which the temperature of the vessel contents was adjusted to 60°C. Next diethylaluminum chloride activator was injected into the vessel, the pressure was increased to 30 psig. at 60°C. with a stream of ethylene and propylene in the proper proportions to give the desired copolymer, and then the $TiCl_3$ catalyst was injected into the vessel. Polymerization was carried out by agitating the reaction mixture for 4 hours at 60°C., additional ethylene and propylene in the proper proportions being added, as necessary, to maintain the pressure at 30 psig. After 4 hours, the polymerization was terminated by adding 30 ml. of isopropyl alcohol and quenching overnight at 60°C. The reactor contents were then washed with a 5% aqueous solution of hydrogen chloride and then with distilled water. The polymer was separated from the diluent by filtration, the filter cake washed with 100 ml. of chlorobenzene containing 1% of stabilizer, and the product was dried under vacuum at 70°C. for 16 hours. Intrinsic viscosity was determined from the relative viscosity of a 0.1% solution of the polymer in decalin at 135°C. Details of the process and the products obtained are given for these examples in Table I, which follows.

manner of these examples, but varied in one or more respects, as noted) are given in Table II, which follows.

Table II

| | | Polymerization Conditions | | | | Insoluble Copolymer | | | |
|---|---|---|---|---|---|---|---|---|---|
| | | Activator | | | Monomer Stream- | | | | |
| Ex. No. | Diluent | Et₂AlCl (mmoles/l) | AlEt₃ (mmoles/l) | TiCl₃ (mmoles/l) | Mole % ethylene | Amount (grams) | % of Total Polymer | Intrinsic Viscosity | Weight % Ethylene | Physical Form |
| Control B | hexane | 10 | — | 5 | 0 | 211 | 95.1 | 4.6 | 0 | granular |
| Control C | hexane | 10 | — | 5 | 3.0⁽¹⁾ | 306 | 95.2 | 2.1 | 1.2 | granular |
| 4 | hexane | 10 | — | 5 | 3.0 | 223 | 92.3 | 5.3 | 1.5 | about 95% fibrous (fiber length 125–250 mils) |
| 5 | hexane | 10 | — | 5 | 10.0 | 65 | 65.1 | 4.1 | 1.9 | completely fibrous (fiber length 125–250 mils) |
| Control D⁽²⁾ | hexane | — | 5 | 5 | 0 | 261 | 57 | 4.5 | 0 | granular |
| Control E⁽²⁾ | hexane | — | 5 | 5 | 10.0 | 176 | —⁽³⁾ | 2.6 | 5.0 | irregular shavings |

⁽¹⁾monomer stream also contained 0.2 mole % hydrogen
⁽²⁾the ratio of activator to catalyst (Al:Ti = 1:1) was selected as the most favorable ratio due to the higher activation efficiency of triethylaluminum as compared with diethylaluminum chloride
⁽³⁾filtrate, after separation of the insoluble polymer, was accidentally lost As can be seen by comparing Example 4 with Controls A, B and C, an intrinsic viscosity greater than 2.0 and an ethylene content of at least 1.5 weight % is required for a fibrous product. Furthermore, Controls B, D and E demonstrate that propylene cannot be homo- Table I

| | | Polymerization Conditions | | | | Insoluble Copolymer | | | |
|---|---|---|---|---|---|---|---|---|---|
| EX. No. | Diluent | Et₂AlCl (mmoles/l) | TiCl₃ (mmoles/l) | monomer stream- mole % ethylene | Amount (grams) | % of Total Polymer | Intrinsic Viscosity | Weight % Ethylene | Physical Form |
| Control A | n-heptane | 15.0 | 7.5 | 3.0⁽²⁾ | 529 | 91.7 | 2.0 | 1.5 | granular (no fibers observed) |
| 1 | n-heptane | 15.0 | 7.5 | 5.0⁽²⁾ | 398 | 94.8 | 2.2 | 1.8 | greater than 60% of the product fibers having a length of 125–250 mils |
| 2 | n-heptane | 10.0 | 5.0 | 10.0 | 121 | 67.7 | 4.0 | 4.5 | completely fibrous (fiber length 125–250 mils) |
| 3 | aliphatic mixture⁽¹⁾ | 10.0 | 5.0 | 10.0 | — | — | 5.5 | 6.8 | completely fibrous (fiber length 125–250 mils) |

⁽¹⁾a mixture of aliphatic hydrocarbons containing 8 to 12 carbon atoms and boiling within the range of 170 to 175°C.
⁽²⁾monomer stream also contained 0.2 mole % hydrogen As can be seen by comparing the above Example 1 with Control A, greater than 1.5 weight % of the ethylene is required in the copolymer to give a fibrous product when the copolymer has an intrinsic viscosity within the range of 2.0 to 2.2

EXAMPLES 4 TO 5

A series of propylene-ethylene copolymerizations were conducted according to procedure of Examples 1 to 3 using as the reaction vessel a Chemco reactor having a diameter of 8 inches, a height of 7.5 inches and a capacity of 4700 milliliters. The reactor contained 4 baffles (4.25 inches × 0.75 inches) and was equipped with a 6 blade, air driven impeller on a 0.75 inch hub, the blades measuring 1.5 inch × 0.94 inch. The speed of the impeller was measured periodically and ranged from 3,800 rpm without load to 2,800 rpm under load. Details of the process and products of these examples as well as those of four control runs (conducted in the manner of these examples, but varied in one or more respects, as noted) are given in Table II, which follows.

polymerized in aliphatic diluents to give fibrous polypropylene using TiCl₃ and a dialkylaluminum halide or a trialkylaluminum halide activator, and that propylene cannot be copolymerized with 10 molar % ethylene in aliphatic diluents to give fibrous copolymers using TiCl₃ and a trialkylaluminum activator. Thus, by the practice of the present invention it is possible to produce useful fibers in good yields.

The nascent copolymer fibers produced in accordance with the present invention have a size aspect and ratio which makes them particularly useful for the formation of nonwoven webs or mats, nonwoven fabrics and synthetic or plastic papers.

What we claim and desire to protect by Letters Patent is:

1. A process for producing high yields of nascent fibers of substantially crystalline copolymers of propylene and ethylene, said copolymers containing 1.5 to 6.8 weight % of ethylene and having an intrinsic viscosity greater than 2.0 and at least 60 % of said nascent fibers having an average diameter of 3 to 12 mils and an average length of 125 to 250 mils, which process consists essentially of the steps of introducing a catalytic amount of $TiCl_3$ into a reaction medium consisting essentially of a saturated aliphatic or alicyclic hydrocarbon diluent containing from six to 12 carbon atoms, a dialkylaluminum halide activator, and a monomer mixture of propylene and from 2.2 up to about 10 molar % of ethylene, agitating the reaction medium under polymerization conditions at a temperature ranging from about 40° to about 70°C. using sufficient agitation to insure adequate contact of the monomer mixture, $TiCl_3$ and dialkyl aluminum halide activator until fibers of said copolymer are produced and then recovering the fibrous product from the reaction medium at a temperature of 70°C. or below, said catalytic amount of $TiCl_3$ ranging from about 1 to about 20 millimoles per liter of diluent and the molar ratio of activator to $TiCl_3$ ranging from 1:1 to 10:1.

2. The process of claim 1 wherein the monomer mixture contains from about 3 to about 10 molar % ethylene.

3. The process of claim 1 wherein the activator is diethylaluminum chloride.

* * * * *